United States Patent [19]

Brandt et al.

[11] Patent Number: 4,732,685

[45] Date of Patent: Mar. 22, 1988

[54] METHOD OF LIQUID-LIQUID EXTRACTION USING MATERIAL EXCHANGE COLUMNS

[75] Inventors: Hans-Walter Brandt, Odenthal; Friedhelm Steffens, Leverkusen; Johannes-Peter Schäfer, Kürten; Jürgen Schröter, Leverkusen, all of Fed. Rep. of Germany

[73] Assignee: Bayer Aktiengesellschaft, Leverkusen, Fed. Rep. of Germany

[21] Appl. No.: 914,223

[22] Filed: Oct. 2, 1986

[30] Foreign Application Priority Data

Oct. 19, 1985 [DE] Fed. Rep. of Germany ... 8529714[U]

[51] Int. Cl.$^4$ .............................................. B01D 11/04
[52] U.S. Cl. ................................... 210/634; 210/748; 210/785; 422/257
[58] Field of Search ............... 210/748, 785, 290, 450, 210/634; 422/257; 261/94, 97, 96

[56] References Cited

U.S. PATENT DOCUMENTS

3,583,856 6/1971 Landau et al. ....................... 422/257

FOREIGN PATENT DOCUMENTS

2092469 8/1982 United Kingdom ................. 422/257

121776 1/1959 U.S.S.R. ............................. 422/257

Primary Examiner—Frank Sever
Attorney, Agent, or Firm—Sprung Horn Kramer & Woods

[57] ABSTRACT

With the extraction method, a material exchange column with an ordered packing 2a or 2b on the basis of a plurality of layers 3 stacked parallel to the column axis and making point contact with one another is used. The packing 2a, 2b is perfused by a continuous and a dispersed phase in a counter current. The packing has a very large specific surface area of at least 300 m$^2$/m$^3$ of packing volume. At the periphery of the packing 2a, 2b, the two phase streams are re-circulated into the packing at regular intervals through a rim seal composed of an elastic material not wettable by the dispersed phase. The rim seal is placed round the packing in the form of an elastic tube or pipe and seals the intermediate space between the internal column wall and the packing. A further improvement in the separating capacity can be achieved if pulsating operation is adopted. The method is characterized, in particular, in that an approximately constant high separating capacity is achieved with a high throughput per unit area over a relatively large loading tolerance of the column.

7 Claims, 2 Drawing Figures

METHOD OF LIQUID-LIQUID EXTRACTION USING MATERIAL EXCHANGE COLUMNS

The invention relates to a method of liquid-liquid extraction using a material exchange column with an ordered packing based on a plurality of layers which are stacked parallel to the column axis, make point contact with one another and are perfused by at least one continuous and one dispersed phase respectively in a counter-current.

A method of this type is described in EP 151 693. The two characterising values for the efficiency of an extraction column are the permitted operating range with the limiting case of the flood limit as well as the separating capacity attainable therein. Basically, a high separating capacity and a large throughput per unit area are desired. However, the two values are normally greatly dependent on one another so that optimum values can only be achieved in a relatively narrow range. In practice, this represents a marked restriction in the design of extraction columns and, in the past, probably meant that the possible applications of liquid-liquid extraction were limited to a small sphere in the chemical industry.

This is where the invention sets in. Starting with the method described at the outset, the object was to obtain an approximately constant high separating capacity with a high throughput relative to area over a relatively great loading range of column.

This object is achieved according to the invention in that an ordered packing whose layers have a specific surface area of at least 300 $m^2/m^3$ of packing volume, preferably of 500 $m^2/m^3$ is used in the material exchange column and the two phase streams (continuous and dispersed) are re-cycled into the packing at regular intervals by an O-ring-shaped rim seal arranged between internal column wall and packing. The rim seal is composed of an elastic tube or pipe which is placed round the packing and is not wettable by the dispersed phase.

An improved separating effect can be achieved if a pulsating movement is superimposed on the two phase streams by a pulsator arranged at the lower end of the column.

The cross-mixing of the two phases is improved if the packings are arranged over one another in the column, each offset by 90° to one another.

Ribbed and perforated plates are advantageously used as elements for the packing or the layers, the ribs of adjacent layers crossing one another.

An elastic metal tube is preferably used as rim seal in the case of an organic dispersed phase and an elastic plastic tube in the case of an aqueous dispersed phase.

The advantage of the method according to the invention resides in the great loading tolerance with respect to the throughput of the two phases with an approximately constant very good separating capacity. In practice, this results in high flexibility in design and in the applications of the method.

The invention is described below with reference to embodiments and drawings.

Figure 1:
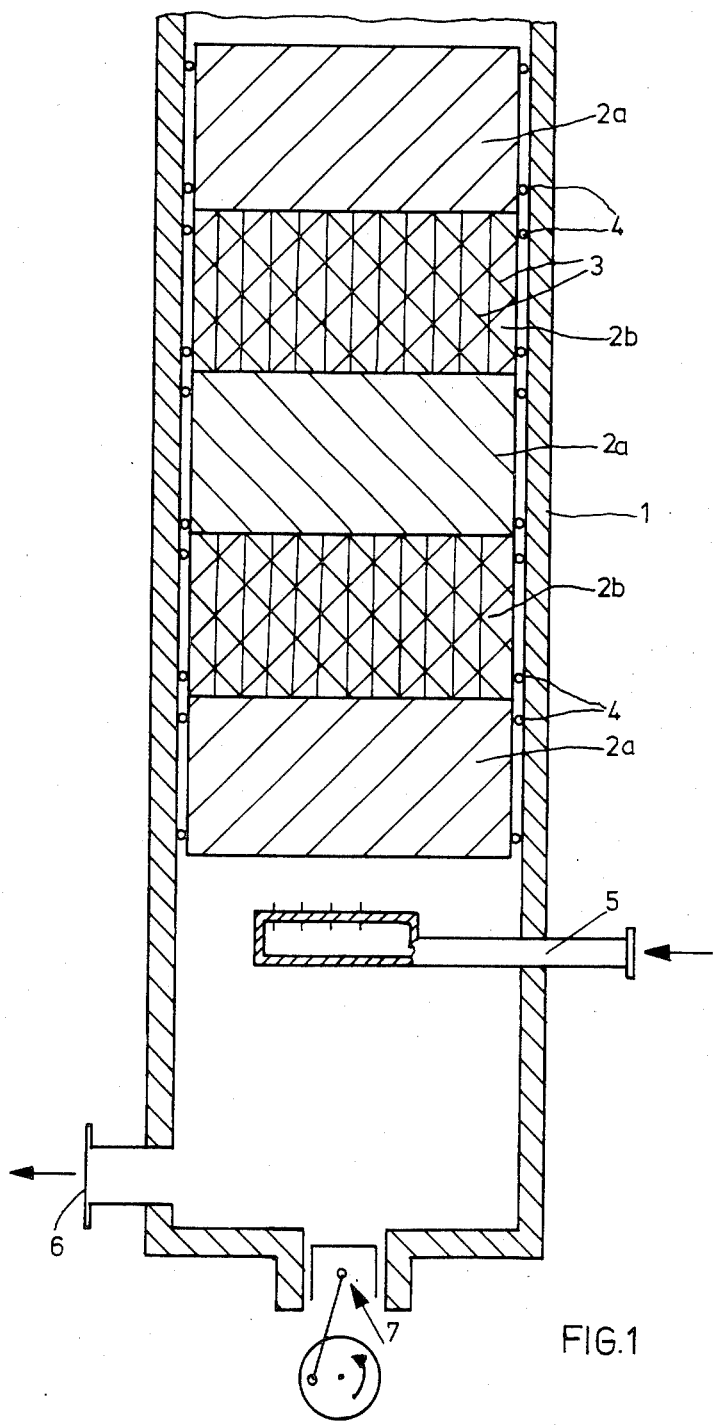
FIG. 1 shows an extraction column with a packing of ribbed plates.

The column according to FIG. 1 comprises the column sheath 1 with the ordered packings 2a and 2b which substantially fill the entire cross-section of the column, located therein. The packings 2a and 2b are each offset by 90° to one another, i.e. twisted by 90° (longitudinal axis) to one another. Thorough cross-mixing is thus achieved. The packing 2a or 2b is formed by layers 3 of flat, bent or corrugated material stacked parallel to the column axis. The surface may be smooth or ribbed and preferably perforated.

Sheet metal, plastic, ceramic material or glass, but preferably refined steel plate having a wall thickness of about 0.3 mm is used as material for the installed elements 3 (layers). It is important for the surface of the dispersed phase not to be wetted so that the rise or fall of droplets through the channels and holes provided can take place between the layers without obstruction. The specific surface area of the packing should be at least 300 $m^2/m^3$ of packing volume, preferably 500 $m^2/m^3$. The bend height of the installed elements is preferably about 12 mm, the bending angle greater than 80°, the layer height about 7 mm and the inclination in the layers at least 45° with a corrugated design, the layer height is reduced to about 5 mm while the bend height of 12 mm in the metal plate which is corrugated in meandering manner remains. The layers 3 make point contact with one another and the ribbing forming the flow channels can have a corrugated or zig-zag shaped contour. An example of this type of packing is Mellapak 500 Y produced by the company Sulzer AG, which is widely used in distillation and rectification columns.

Rim seals 4 composed of an elastic tube are inserted between the packing 2a, 2b and the column sheath 1. The material of which the tube is composed is selected in such a way that the dispersed phase does not wet the rim seal 4. A metal tube is therefore used as a rim seal in the case of an organic dispersed phase and a plastic tube composed, for example of Teflon or polyethylene in the case of an aqueous dispersed phase.

The cross-sectional shape of the tube can also be square or can be designed in the form of a segment-shaped sealing lip. The rim seals are arranged at regular intervals as shown in FIG. 1. The elastic tube placed round the packing in the manner of an O-ring allows perfect re-circulation of the dispersed and continuous phase flowing between packing 2a or 2b and column wall 1 into the packing so that the phases flowing in a counter-current participate fully in the exchange of material. The rim seal therefore results in substantially improved flow guidance at the periphery of the packing. The separating capacity of the column could be substantially improved in this way with substantially constant cross-sectional loading.

The inlet 5 for the light phase is located at the lower end of the column and the outlet 6 for the heavy phase on the base of the column. The heavy phase is supplied at the upper end of the column. The light phase is removed by free overflow. At the base of the column a pulsating piston 7 is provided for which is driven by a push rod connected to an excenter drive or by pneumatic or hydraulic means. The pulsating piston 7 sets the entire liquid content of the column into vibration producing a greater area for the exchange of material with a narrower spectrum of droplets. The effectiveness can be further improved in this way. In fact, the effect of the rim seal would be expected to be of lesser importance during pulsating operation. However, it has surprisingly been found that the rim seal leads to a considerable increase in efficiency during the pulsating operation.

The greatest progress with respect to separating capacity and tolerance when determining the operating range for the throughput of the two phases per unit area is achieved by combining the three measures (a)-(c):

(a) Use of narrow-channelled packing with a large specific surface area (greater than 300 m²/m³ of packing volume.

(b) Re-circulation of the two phases to the column centre owing to the rim seal and (c) Pulsating operation.

In all, the efficiency could be doubled while at the same time improving the tolerance when determining the throughput of the two phases.

According to definition, the maximum permitted load per unit area within the tolerance when selecting the operating point corresponds to the flood limit. Hereinafter, it will be called "Flood Load" ($B_{FL}$). The number of theoretical stages attainable per metre of column height or the reciprocal thereof, i.e. the height of a theoretical stage which is usually designated by HETS, is used as the characteristic value of the separating capacity.

Figure 2:
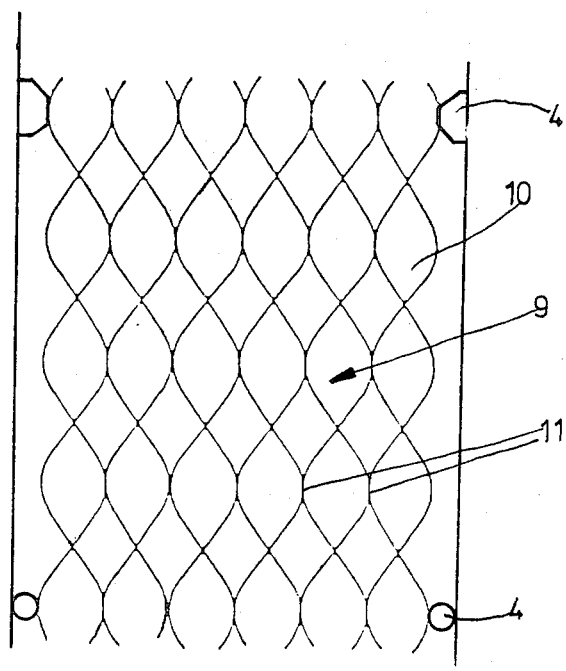
FIG. 2 shows an extraction column with a packing of coiled strips.

In principle the rim seal leads to an improvement of the separating capacity in all ordered packings usable in liquid-liquid extraction columns. However, the effect is not so pronounced in that case as under the conditions described above. Thus, FIG. 2 shows as further embodiment a detail of an extraction column with a packing 9 composed of a plurality of regularly arranged coils 10 which are parallel to the axis. The coils 10 are produced by twisting strips of sheet metal or plastics material. They are arranged in the packing in such a way that they have a plurality of points of contact 11 with one another. A rim seal 4 composed of a sprung tube of segment-shaped cross-section is indicated at the upper end and of circular cross-section at the lower end. The form of the rim seal is not generally critical. The only deciding factor is that boundary streams are prevented by the surrounding sealing element.

COMPARISON EXAMPLES

EXAMPLE 1

An average efficiency HETS=0.55 m was achieved with the standardised test mixture water-acetone-toluene in an extraction column DN100 filled to a height of 3780 mm with a Mellapak 500 Y produced by the company Sulzer, without rim seal and without pulsation. The phase ratio between the dispersed and continuous phase was predetermined at $$\frac{V_d}{V_c} = 1.5:1 \text{ parts by volume.}$$

The flood load was measured at $B_{FL}=82$ m³/m²h

EXAMPLE 2

An average HETS value of 0.4 m was again measured without rim seal with the same test mixture and using the column described in example 1 with pulsation at a product of amplitude and frequency of 1000 mm/min.

The flood load $B_{FL}$ was $B_{FL}=67.5$ m³/m²h with the same feed ratio.

EXAMPLE 3

Using the same test system and apparatus as in the preceding examples, an average HETS value of 0.3 m was achieved with identical intensity of pulsation using a rim seal. The flood load was $B_{FL}=67.5$ m³/m²h, as above.

Each test series obtained in connection with the preceding examples consisted of at least four and generally six reproducible individual measurements over the entire load tolerance.

EXAMPLES 4 AND 5

In addition, similar measurements to the foregoing examples were carried out using the water-acetone-n-butyl-acetate test system. An average HETS value of 0.7 m was achieved as result under the conditions mentioned in Example 1 and at feed ratio $V_d/V_c=1:1$ parts by volume. The flood load was $B_{FL}$ 86 m³/m²h. An average HETS value of 0.33 m was achieved at a flood load of $B_{FL}=57$ m³/n²h under the conditions mentioned in Example 3.

We claim:

1. A method of liquid-liquid extraction using a material exchange column having an internal column wall with an ordered packing based on a plurality of layers which are stacked parallel to the column axis and make point contact with one another the method comprising employing a packing having a plurality of vertically stacked layers making point contact with one another, said layers having a specific surface area of at least 300 m²/m³ of packing volume, conveying at least one continuous phase and one dispersed phase through the packing, consecutively or periodically redirecting the at least one continuous phase and at least one dispersed phase from a peripheral zone of the packing into a center portion of the packing by a plurality of rim seal means, said rim seal means being composed of an elastic material not wettable by the dispersed phase and which are provided for in a form of a tube sealing an annular gap between the packing and the internal column wall, against the packing.

2. A method according to claim 1, wherein a pulsating movement is superimposed on the at least one continuous phase and the at least one dispersed phase by a pulsator arranged at the lower end of the column.

3. A method according to claim 1, wherein a high cross-mixing of the at least one continuous phase and the at least one dispersed phase is produced by packings which are arranged over one another, each offset by 90° to one another in the column.

4. A method according to claim 1, wherein ribbed and perforated plates are used as elements for the layers, the ribs of adjacent layers crossing one another.

5. A method according to claim 1 wherein an elastic metal tube is used as a rim seal in the case of an organic dispersed phase.

6. A method according to claim 1 wherein an elastic plastic tube is used as a rim seal in the case of an aqueous dispersed phase.

7. A method according to claim1, wherein the specific surface area of the packing layers is 500 m²/m³.

* * * * *